(No Model.)
J. SMITH.
FLOATING TEA OR COFFEE EXTRACTOR.
No. 476,568. Patented June 7, 1892.
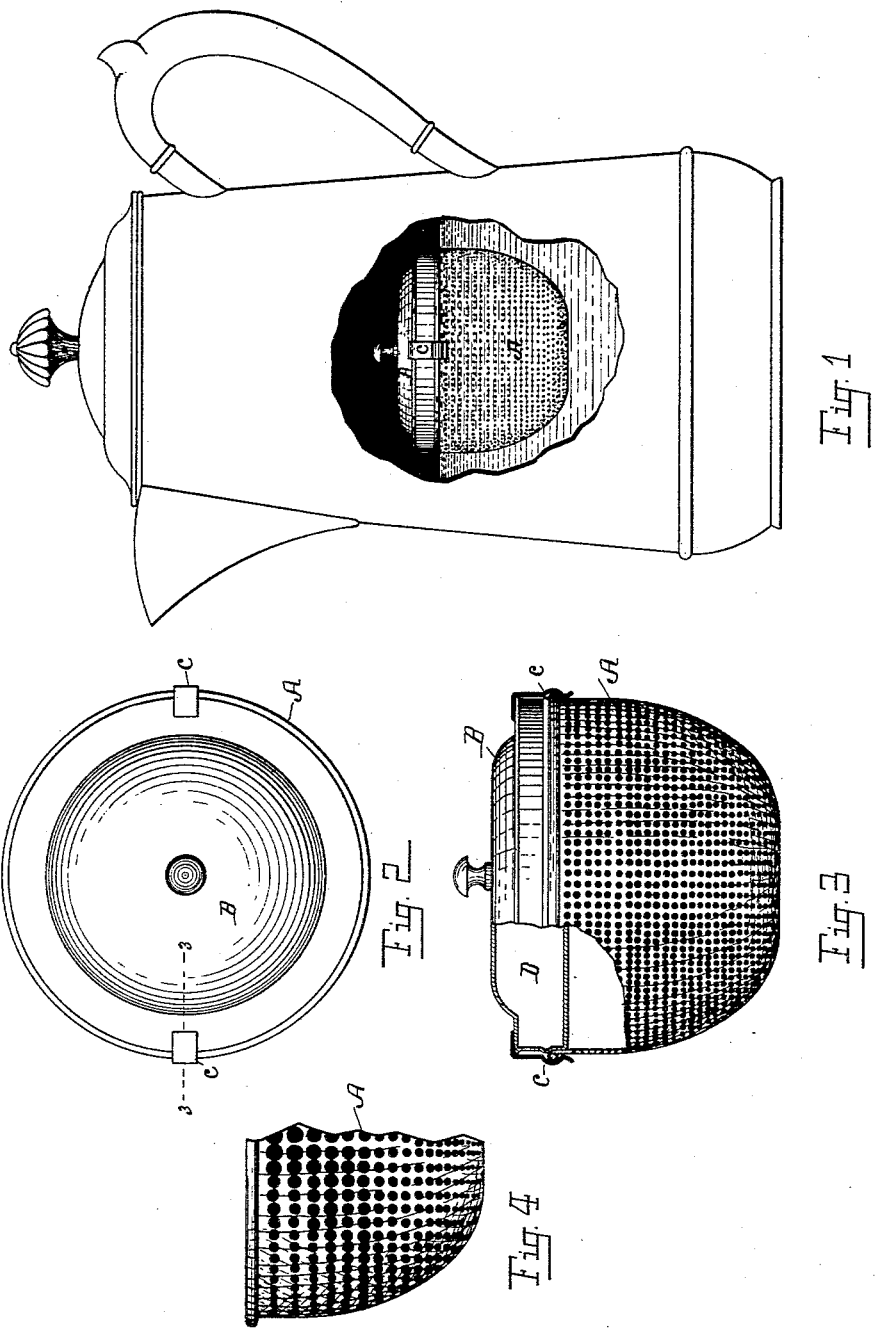
Witnesses:
Walter S. Wood
Marian Longyear
Inventor.
Joshua Smith
By Lucius C. West
Att'y.

UNITED STATES PATENT OFFICE.

JOSHUA SMITH, OF CASCO, MICHIGAN.

FLOATING TEA OR COFFEE EXTRACTOR.

SPECIFICATION forming part of Letters Patent No. 476,568, dated June 7, 1892.

Application filed January 18, 1892. Serial No. 418,419. (No model.)

*To all whom it may concern:*

Be it known that I, JOSHUA SMITH, a citizen of the United States, residing at Casco, county of Allegan, State of Michigan, have invented a new and useful Floating Tea or Coffee Extractor, of which the following is a specification.

This invention relates to devices for keeping tea or coffee separated from the water in which it is steeped; and its object is to construct a receptacle for the purpose which is adapted to float in water in any ordinary tea-pot or coffee-pot, all as more particularly described below.
In the drawings forming a part of this specification, Figure 1 is a side elevation showing the operation; Fig. 2, a plan view of Fig. 3; Fig. 3, an enlarged view of the float shown in Fig. 1, parts being in section on line 3 3 in Fig. 2; and Fig. 4, a broken view of Fig. 3, showing a change.

The floating receptacle consists of a perforated dish-like base A, which base may be made in any suitable shape and of any suitable metal, either tin or otherwise, and is designed for holding the tea or coffee. The base, as here shown, is hemispherical in form and is externally ribbed at the upper edge, as in Figs. 3 and 4, by the use of wire or otherwise. This receptacle is closed by a cover B, which cover is hollow, thus being provided with a dead-air chamber D, Fig. 3. This cover fits into or onto the base-receptacle in a manner to close the same, and, as here shown, is held detachably attached to said receptacle by elastic clamps c at the sides, which clamps are kinked outward near their free end, so that they will spring over and catch onto the exterior rib at upper edge of the receptacle A; but any other suitable mode of attaching the cover may be adopted.

In Figs. 1 and 3 the perforations in the base-receptacle are designed to be all of the same size, while in Fig. 4 these perforations are graduated in size from the top to the base, being larger at the top, thus admitting water more readily into the upper portion and retarding the sifting through the bottom of the fine particles of coffee or tea.

The manner of using the floating receptacle is illustrated in Fig. 1, wherein the dead-air-chamber cover causes it to float with the perforated receptacle immersed in the water, by which means the strength of the coffee or tea is extracted, while the dregs remain in the perforated receptacle.

This floating tea or coffee extractor may be made of different sizes, and, owing to its convenience and cheapness, can be readily available for use in the ordinary coffee or tea pots already in use.

Having thus described my invention, what I claim as new, and desire to secure by Letters Patent of the United States, is—

A floating coffee or tea extractor consisting of a dish-like base provided with a series of perforations graduated in size from the top to the bottom, said perforations being largest at the top, a cover having a dead-air chamber, and means for attaching said cover to the base, substantially as set forth.

In testimony that I claim the foregoing I have hereunto subscribed my name in the presence of two witnesses.

JOSHUA SMITH.

Witnesses:
 HENRY STERN,
 FRANK HENDERSON.